United States Patent [19]

Kato

[11] Patent Number: 4,742,419
[45] Date of Patent: May 3, 1988

[54] HUB ASSEMBLY FOR A RECORDING DISC CARTRIDGE

[75] Inventor: Yoshitake Kato, Ibaragi, Japan

[73] Assignee: Hitachi Maxell, Ltd., Osaka, Japan

[21] Appl. No.: 914,583

[22] Filed: Oct. 3, 1986

Related U.S. Application Data

[63] Continuation of Ser. No. 519,905, Aug. 3, 1983, abandoned.

[30] Foreign Application Priority Data

Aug. 5, 1982 [JP] Japan ............................ 57-119574[U]
Aug. 12, 1982 [JP] Japan ............................ 57-122662[U]
Nov. 7, 1982 [JP] Japan ............................ 57-168267[U]

[51] Int. Cl.⁴ .................... G11B 23/03; G11B 5/016; G11B 5/012
[52] U.S. Cl. ...................... 360/133; 360/99; 369/282
[58] Field of Search ............ 360/133, 97–99, 360/135; 369/271, 282

[56] References Cited

U.S. PATENT DOCUMENTS

| | | | |
|---|---|---|---|
| 832,403 | 10/1906 | Milans | 369/282 X |
| 1,417,339 | 5/1922 | Lenton | 369/282 |
| 1,821,916 | 9/1931 | Acheson et al. | 369/290 |
| 1,824,253 | 9/1931 | Acheson | 369/282 |
| 1,849,378 | 2/1932 | Acheson | 369/282 |
| 3,682,487 | 8/1972 | Eriksson | 346/137 |
| 4,060,839 | 11/1977 | Meadows | 360/99 |
| 4,149,207 | 4/1979 | Porter, Jr. et al. | 360/133 |
| 4,152,740 | 5/1979 | Stratton | 360/133 |
| 4,298,976 | 11/1981 | Irvin et al. | 369/282 X |
| 4,441,178 | 4/1984 | Kobayashi et al. | 346/137 |
| 4,445,155 | 4/1984 | Takahashi et al. | 360/99 |
| 4,459,628 | 7/1984 | Barton | 360/99 |
| 4,466,032 | 8/1984 | Saito | 360/97 |
| 4,503,474 | 3/1985 | Nigan | 360/133 |
| 4,532,564 | 7/1985 | Larson et al. | 360/97 |
| 4,583,144 | 4/1986 | Kato | 360/135 |
| 4,613,921 | 9/1986 | Holmes | 360/97 |

FOREIGN PATENT DOCUMENTS

| | | | |
|---|---|---|---|
| 0116471 | 8/1984 | European Pat. Off. | 360/99 |
| 1082428 | 5/1960 | Fed. Rep. of Germany | 369/282 |
| 54-160208 | 12/1979 | Japan | 369/271 |

OTHER PUBLICATIONS

IBM Technical Disclosure Bulletin, vol. 13, No. 5, Oct. 1970, p. 1242, "Disk Pack Locating Device" by Klutch.
IBM Technical Disclosure Bulletin, vol. 19, No. 12, May 1977, pp. 4722–4723, "Hub Assembly for Flexible Disk Media" by Beck et al.

Primary Examiner—John H. Wolff
Assistant Examiner—Alfonso Garcia
Attorney, Agent, or Firm—Birch, Stewart, Kolasch & Birch

[57] ABSTRACT

Disclosed herein is a recording disc cartridge having recording disc rotatably mounted in a cartridge case by a hub assembly. The hub assembly comprises a receiving hole defined in its central portion for receiving a supporting shaft of a drive unit of a recording/reproducing apparatus, at least two wall members having flat surfaces disposed to face to the central hole with a predetermined angle in plan view, an annular guide groove formed around the receiving hole to receive a drive shaft of the drive unit and a rib member formed across the guide groove for being engaged with the drive shaft in such a position that the supporting shaft is pressed against the two flat wall members by rotational force of the drive shaft. A resilient arcuate arm projects from one of the wall members to clamp the supporting shaft of the drive unit of the recording/reproducing apparatus in the receiving hole of the hub assembly.

22 Claims, 15 Drawing Sheets

4,742,419

RECORDING HEAD

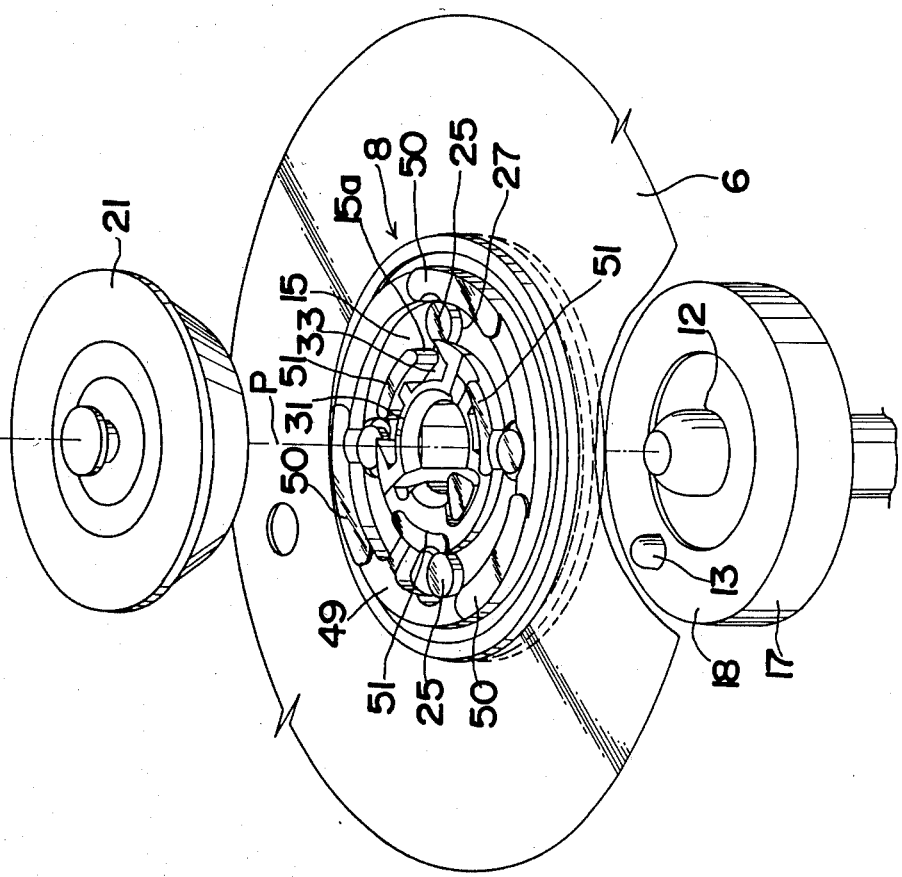
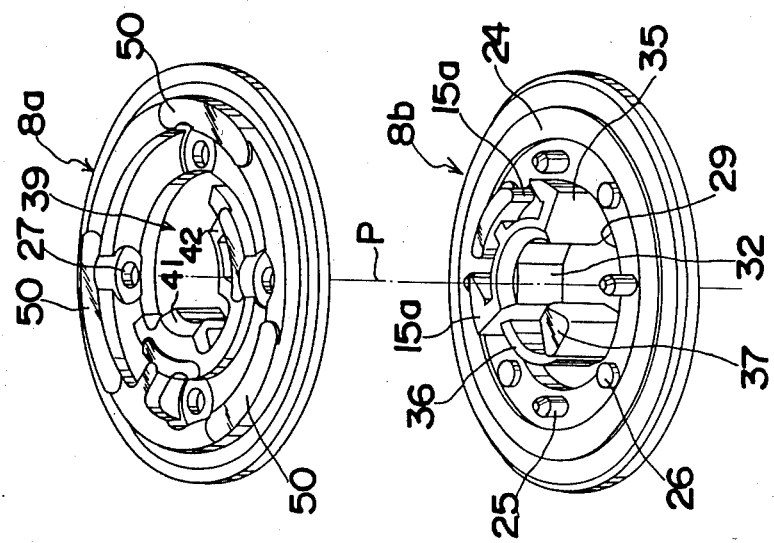

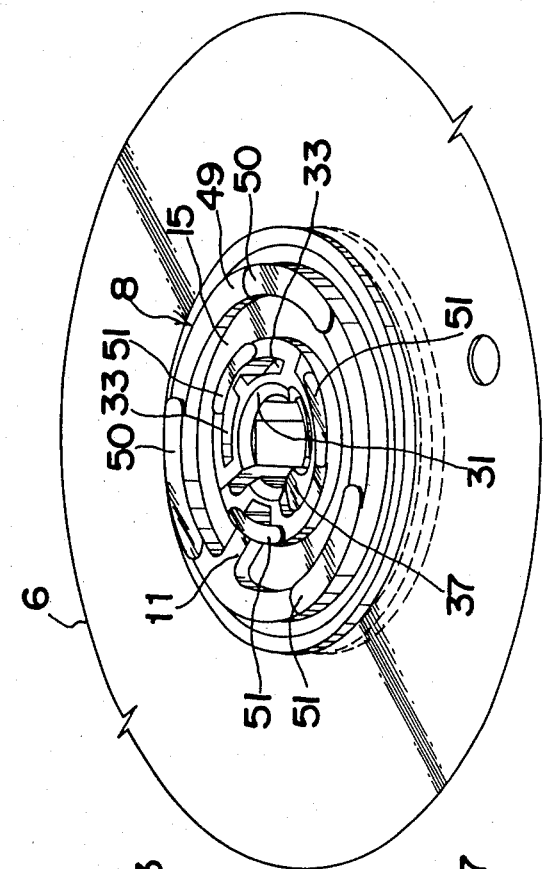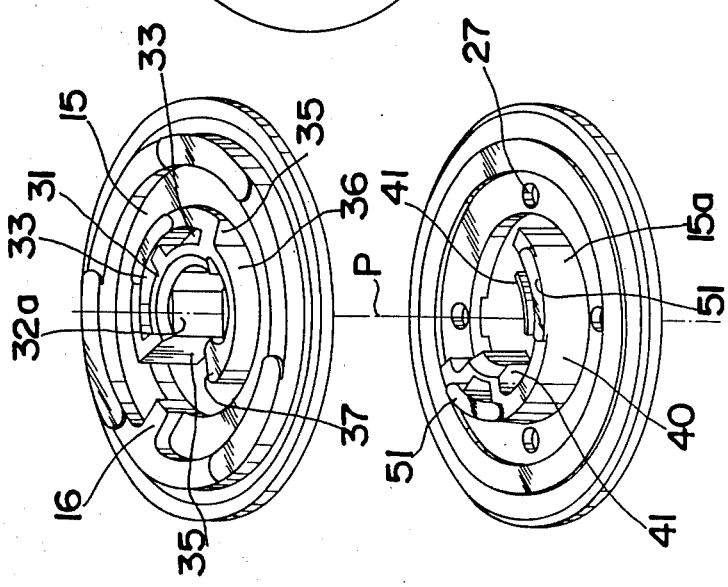

HUB ASSEMBLY FOR A RECORDING DISC CARTRIDGE

This application is a continuation of application Ser. No. 519,905 filed on Aug. 3, 1983, now abandoned.

BACKGROUND OF THE INVENTION

1. Field of the Invention

The present invention relates to a recording disc cartridge, and, more particularly, to a recording disc cartridge which has, for example, a flexible recording disc enclosed in a thin protective cartridge case.

2. Discussion of Related Art

In a magnetic recording disc cartridge of the above type, the flexible magnetic recording disc is rotatably supported in the cartridge case by a hub assembly, both upper and lower portions of which are situated in a drive shaft inspection window of the cartridge case so that the hub assembly is engaged with a drive unit of a magnetic recording/reproducing apparatus which is inserted through the drive shaft insertion window for rotating the magnetic recording disc.

More specifically, a supporting shaft or a spindle of the drive unit projecting at the center thereof is inserted in a central receiving hole of the hub assembly through the drive shaft insertion window and a drive shaft eccentrically situated with respect to the center of the drive unit is engaged with an engaging member formed in the hub assembly, so that rotation of the hub assembly or the magnetic recording disc is effected by rotation of the drive shaft of the drive unit with the axis of rotation being defined by the supporting shaft engaged in the central hole of the hub assembly.

In the magnetic recording disc cartridge of the above type, the hub assembly is required to be located in exactly the same position relative to the supporting shaft whenever the magnetic recording disc cartridge is mounted on the recording/reproducing apparatus otherwise, recording tracks traced by a magnetic recording head would be changed. In order to locate the hub assembly always in the exactly same position relative to the supporting shaft, the hub assembly must be made with a high degree of accuracy with respect to its geometric dimensions.

In order to solve this problem, U.S. Pat. No. 4,152,740 discloses a hub structure in which a driven surface for engagement with the drive shaft deviates from the radial center line of the receiving hole of the hub so that the drive shaft is engaged with the driven surface at such an angle that the hub is laterally moved to bring the wall of the receiving hole into contact with the supporting shaft. By virtue of this construction, contact is ensured at two unique positions, i.e., between the drive shaft and the driven surface and between the supporting shaft and the wall of the receiving hole, so that the hub is always located in the exactly the same position relative to the supporting shaft.

However, in the case of the hub structure described above, if the force exerted on the drive shaft is changed due to change of frictional force between a recording head and a magnetic recording disc, the contact point between the drive shaft and the driven surface is accordingly changed, resulting in displacement of the contact point between the supporting shaft and the wall of the receiving hole, and thus the hub will not be located in the same position relative to the supporting shaft.

SUMMARY OF THE INVENTION

Accordingly, an essential object of the present invention is to provide a recording disc cartridge inclusive of a hub assembly capable of being located in exactly the same position relative to the supporting shaft to trace the same recording tracks without requiring high accuracy regarding the geometric dimensions of the hub assembly.

Another object of the present invention is to provide a recording disc cartridge in which the drive shaft of the recording/reproducing apparatus can easily and reliably be engaged with the engaging member of a hub assembly within no more than one rotation of the drive shaft, so that the recording disc can be rapidly mounted on the recording/reproducing apparatus.

According to the present invention, there is provided a magnetic recording disc cartridge which comprises a cartridge case having a first opening for insertion of a drive unit of a recording/reproducing apparatus and a second opening for insertion of a recording head of a recording/reproducing apparatus and a magnetic recording disc rotatably mounted in the cartridge case by a hub assembly attached to the center of the recording disc within the first opening. The hub assembly comprises a receiving hole defined in its central portion for receiving a supporting shaft of the drive unit, at least two wall members having flat surfaces disposed to face the central hole with a predetermined angle in plan view, an annular guide groove formed around the receiving hole to receive a drive shaft of the drive unit and a rib member formed across the guide groove in the radial direction for being engaged with the drive shaft in such a position that the supporting shaft is pressed against the two flat wall members by the rotational force of the drive shaft.

BRIEF EXPLANATION OF THE DRAWINGS

FIG. 15 is an exploded perspective view showing the hub assembly used in the second embodiment of the present invention;

FIG. 16 is a perspective view showing the hub assembly mounted on the drive unit;

FIG. 17 is an exploded perspective view of the hub assembly which is upside-down relative to FIG. 15;

FIG. 18 is a perspective view of the hub assembly with a recording disc attached thereto;

DESCRIPTION OF THE PREFERRED EMBODIMENTS

Figure 1:
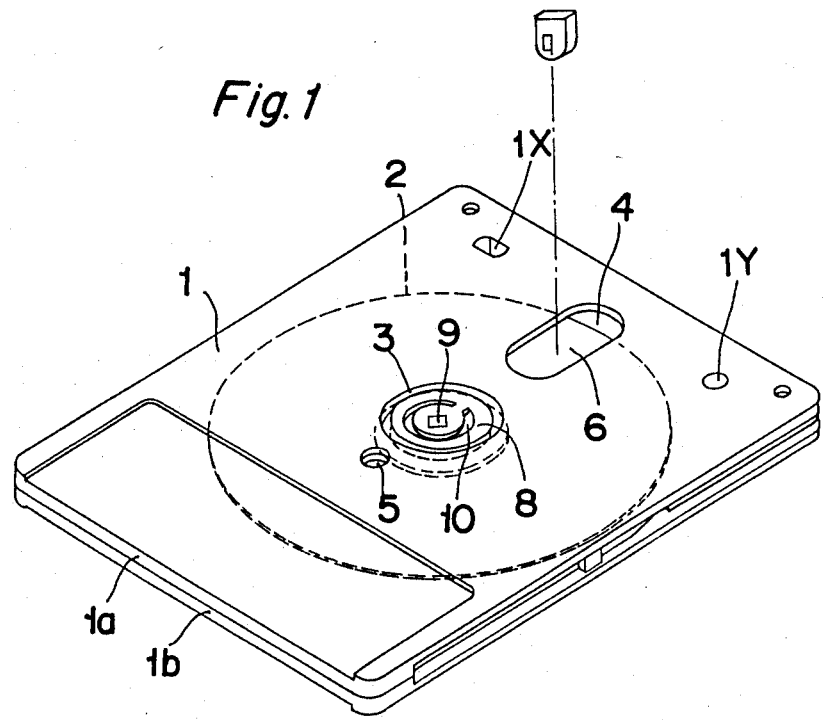
FIG. 1 is a perspective view showing a magnetic recording disc cartridge according to the present invention.
Figure 2:
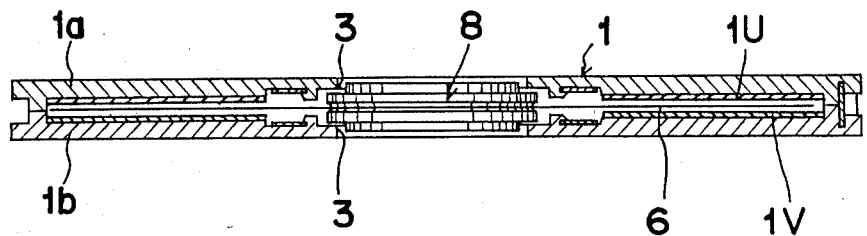
FIG. 2 is a cross sectional view of FIG. 1.

In FIGS. 1 and 2, there is shown a magnetic recording disc cartridge according to the present invention, which comprises a thin rectangular cartridge case 1 made of hard plastic resin material and consisting of a top section 1a and a bottom section 1b integrally connected with each other and a magnetic recording disc 2 rotatably contained in a space within the cartridge case 1.

Liners 1U and 1V made of non-woven cloth are laid on the inner surfaces of the top section 1a and the bottom section 1b for assuring smooth rotation of the magnetic recording disc 2.

The cartridge case 1 has a drive shaft insertion window 3 formed at a substantially central portion, an elongated magnetic head insertion window 4 positioned in front of the drive shaft insertion window 3 and an index hole 5 positioned behind the drive shaft insertion window 3, each opening formed piercing the top section 1a and the bottom section 1b.

Numerals 1X and 1Y indicate pin receiving holes adapted to be engaged with standard pins of the recording/reproducing apparatus for locating the cartridge case 1 in a correct position on the recording/reproducing apparatus.

Figure 4:
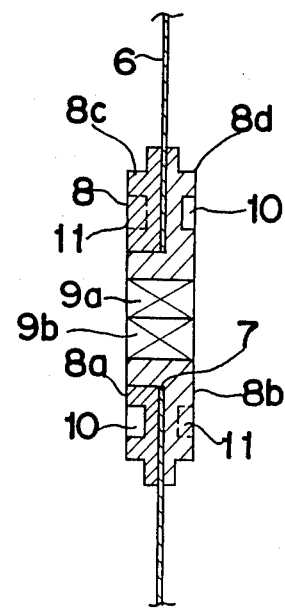
FIG. 4 is a cross sectional view of the hub assembly shown in FIG. 3.

The magnetic recording disc 2 comprises an annular flexible magnetic recording sheet 6 having a central hole 7 (FIG. 4) with a hub assembly 8 made of plastic resin material engaged in the central hole 7. As shown in FIG. 4, the hub assembly 8 is formed by an upper hub member 8a and a lower hub member 8b, which are integrally connected with each other by a method such as ultrasonic welding, and fixedly clamps the circumferential portion of the central hole 7 of the magnetic recording sheet 6 therebetween. An upper boss 8c and a lower boss 8d of the hub assembly 8 are rotatably fitted in the drive shaft insertion window 3 of the cartridge case 1.

Figure 3:
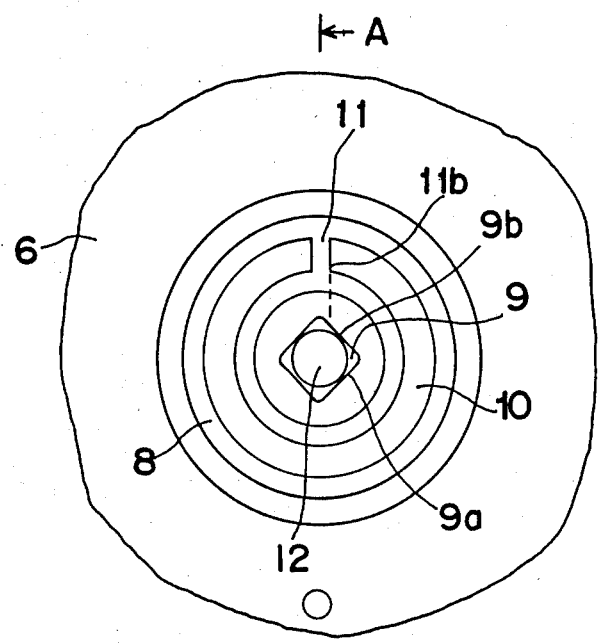
FIG. 3 is a top plan view of a first embodiment of a hub assembly used in the magnetic recording disc cartridge shown in FIG. 1.
Figure 5:
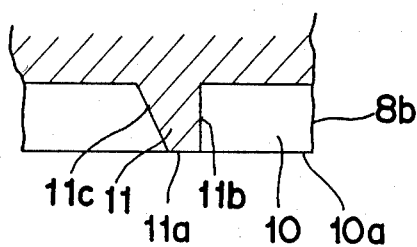
FIG. 5 is a partially enlarged cross sectional view of FIG. 4.

In FIG. 3, the hub assembly 8 has in its center a receiving hole 9 which is square-shaped in plan view. Further, annular guide grooves 10 are concavely formed in the upper and lower end surfaces of the hub assembly 8 coaxially along the receiving hole 9, each of the annular guide grooves 10 being provided with a rib 11 which blocks a part of the guide groove 10. As shown in FIG. 5, the end surface 11a of the rib 11 is flush with the end surface 10a of the hub assembly 8, and one side surface of the rib 11 is formed as a vertical engaging surface 11b extending in the radial direction across the guide groove 10 and is perpendicular to the end surface 11a while the other side surface 11c is downwardly inclined.

In the shown embodiment, each of the ribs 11 is formed at a position opposite to one corner of the receiving hole 9. However, the positions of the ribs 11 may be slightly displaced from the corresponding corners of the receiving hole 9.

Figure 6:
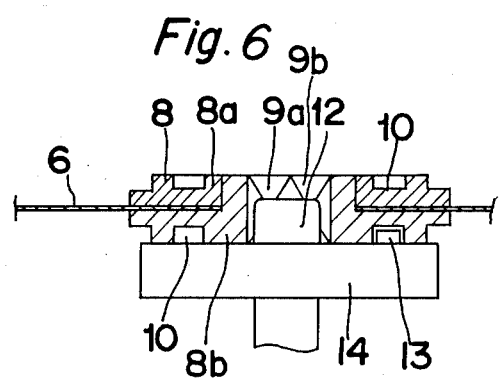
FIG. 6 is a cross sectional view showing the hub assembly mounted on a drive unit.
Figure 7:
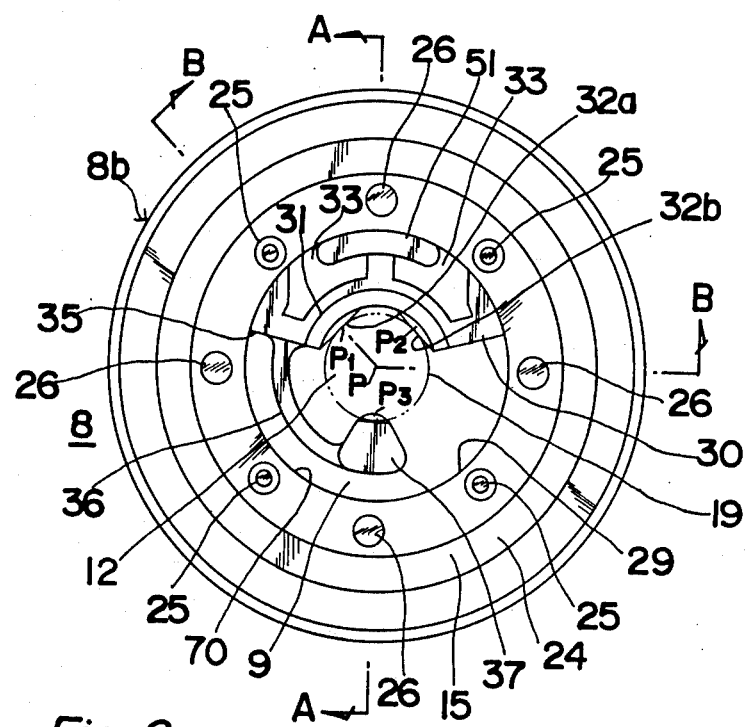
FIG. 7 is a bottom plan view of a lower hub member used in the second embodiment of the present invention.

A drive unit provided in a recording and/or reproducing apparatus for the aforementioned magnetic recording disc cartridge comprises a disc 14 for receiving the hub assembly 8, a supporting shaft 12 which is coaxial with the disc 14 and a drive shaft 13 projectingly formed in a position eccentric from the supporting shaft 12, as shown in FIG. 6.

When the magnetic recording disc cartridge of the aforementioned construction is mounted on the drive unit of the recording/reproducing apparatus, the lower end surface of the hub assembly 8 is placed on the disc 14, and the supporting shaft 12 of the drive unit is received in the receiving hole 9 of the hub assembly 8 while the drive shaft 13, which is eccentric to the supporting shaft 12, is engaged in the guide groove 10, as shown in FIG. 6. When the disc 14 and the supporting shaft 12 are rotated, the drive shaft 13 is moved in the guide groove 10 to be engaged with the vertical engaging surface 11b of the rib 11, thereby rotating the hub assembly 8 and the magnetic recording disc 2. Since the receiving hole 9 of the hub assembly 8 is formed square-shaped, the supporting shaft 12 is pressed against two flat surfaces 9a and 9b of the receiving hole 9, as shown in FIG. 3, upon contact of the drive shaft 13 with the rib 11. Therefore, no play is defined between the supporting shaft 12 and the flat surfaces 9a and 9b of the receiving hole 9, leading to correct location of the hub assembly 8, i.e., the magnetic recording sheet 6, and thus deviation of a recording track of the magnetic recording sheet 6 can be prevented. Further, even if the drive shaft 13 is brought into contact with the end surface 11a of the rib 11 upon mounting of the magnetic recording disc cartridge in the recording/reproducing apparatus, the drive shaft 13 slides along the downwardly inclined surface 11c, to be smoothly guided into the guide groove 10 without receiving any impact.

In the shown embodiment, the guide grooves 10 are symmetrically formed in the upper and lower end surfaces of the hub assembly 8 and the receiving hole 9 is vertically perforatedly formed such that both sides of the magnetic recording disc cartridge can be used interchangeably in a vertically reversed manner, though, in a magnetic recording disc cartridge of a one-sided type, the hub assembly 8 may be provided in its end surface, which is to be used, with one guide groove 10 having the rib 11, and the receiving hole 9 may be provided in the form of a blind hole.

In FIGS. 7 through 10 showing a second embodiment of the present invention, the lower hub member 8b has a through hole 29 formed in its central portion and a fanshaped wall member 30 projecting from a part of an inner cylindrical surface 70 of the lower hub member 8b defining the through hole 29, toward the center of the lower hub member 8b at an angle of about 150° in the circumferential direction. The wall member 30 has its intermediate portion integrally formed with an inner peripheral wall member 31 defining a part of the inner periphery of the receiving hole 9.

The inner peripheral wall member 31 is provided with a pair of flat contact surfaces 32a and 32b which are formed at a predetermined angle θ (about 90° in the shown embodiment) to be in line contact at two positions $P_1$ and $P_2$ with the outer peripheral surface of the supporting shaft 12 when the hub assembly 8 is fitted with the drive unit of the magnetic recording/reproducing apparatus in a similar manner to that explained with respect to the first embodiment. The angle θ between the contact surfaces 32a and 32b may be within a range of about 60° to 120°. The contact surfaces 32a and 32b are symmetrical to a central axis P of the hub assembly 8, and respectively has a height substantially corresponding to the thickness of the hub assembly 8. In the upper and lower surfaces of the wall member 30, two symmetrical small recesses 33 are defined with a generally semicircular shape in plan view along the contact surfaces 32a and 32b to adjust the thickness of the peripheral wall member 31 so that no sink mark appears in the process of plastic forming, especially in the contact surfaces 32a and 32b.

An arcuate arm 36 projects from one side surface 35 of the wall member 30 to extend up to a position opposite to a central wall 32c between the flat contact surfaces 32a and 32b in conformity to the through hole 29 with resiliency in the radial direction. The free end of the arcuate arm 36 is provided with a contact member 37 having an arcuate surface 38 projecting toward the center of the hub assembly 8 so that when the supporting shaft 12 of the drive unit is inserted in the through hole, the supporting shaft 12 is clamped by the contact member 37 and the contact surfaces 32a and 32b at three points $P_1$, $P_2$ and $P_3$.

A guide groove 15, which corresponds to the guide groove 10 in the first embodiment, of the hub assembly 8 as shown in FIGS. 3 and 4, is defined in the bottom of the lower hub member 8b with the rib 11 extending across the same.

In FIGS. 11 through 14, the upper hub member 8a has a through hole 39 in its central portion for engagement with the peripheral wall member 31 of the lower hub member 8b and a partial boss 40 in the form of a semi-cylindrical wall with an extension angle of 180° in the circumferential direction for engagement with the through hole 29 of the lower hub member 8b. The partial boss 40 comprises a wall member 15a forming the inner wall of the lower guide groove 15 of the hub assembly 8, which corresponds to the guide groove 10 in the first embodiment, first and second engaging walls 41 and 42 projecting from the wall member 15a toward the central axis P for forming a part of the receiving hole 9 and a concavity 43 formed between the engaging walls 41 and 42 piercingly in the vertical direction. The first engaging wall 41 is inverted L-shaped in cross section, and has a downwardly opened groove 44 which is arcuated in plan view. Accuracy of the curvature of the inner wall surface 45 is improved by the groove 44 in the forming operation. The second engaging wall 42 has spaces 46 in its upper and lower portions. Each of the projecting inner wall surfaces 45 and 47 of the first and second engaging walls 41 and 42 has a vertical length ranging substantially from the upper surface of the upper hub member 8a to the lower surface of the lower hub member 8b.

Figure 9:
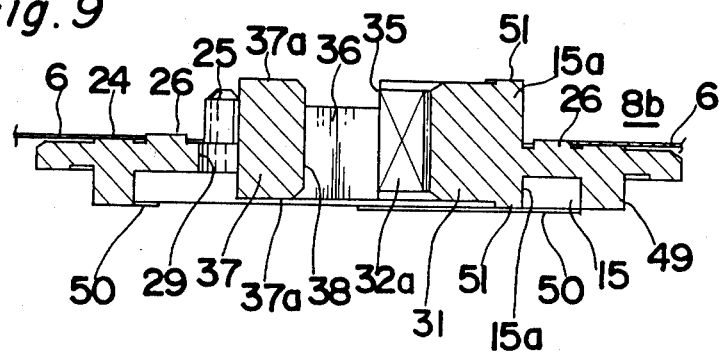
FIG. 9 is a cross sectional view taken along the line A—A in FIG. 7.
Figure 13:
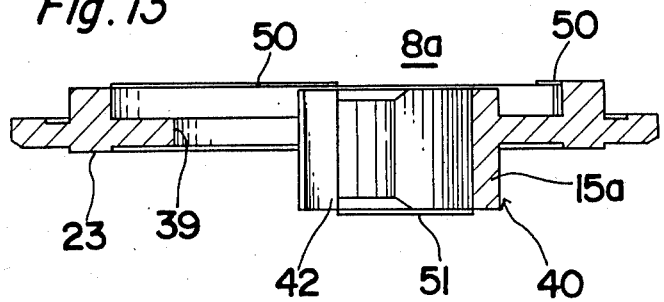
FIG. 13 is a cross sectional view taken along the line C—C in FIG. 11.
Figure 12:
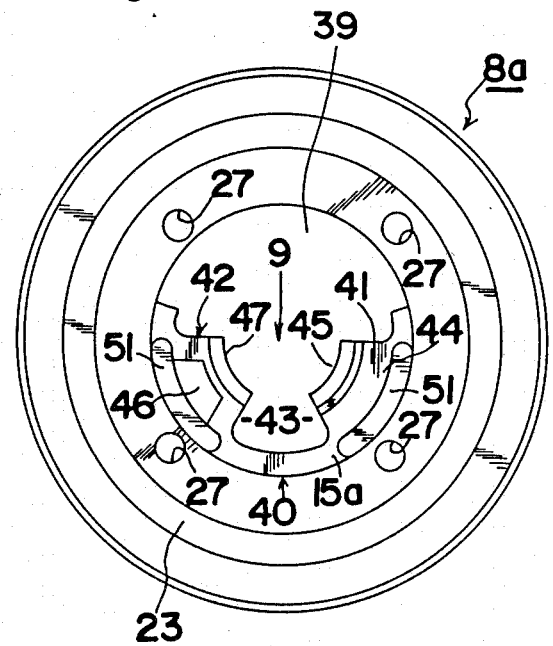
FIG. 12 is a top plan view of the upper hub member.
Figure 14:
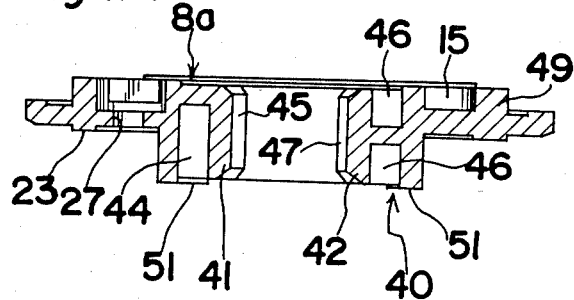
FIG. 14 is a cross sectional view taken along the line D—D in FIG. 11.
Figure 21:
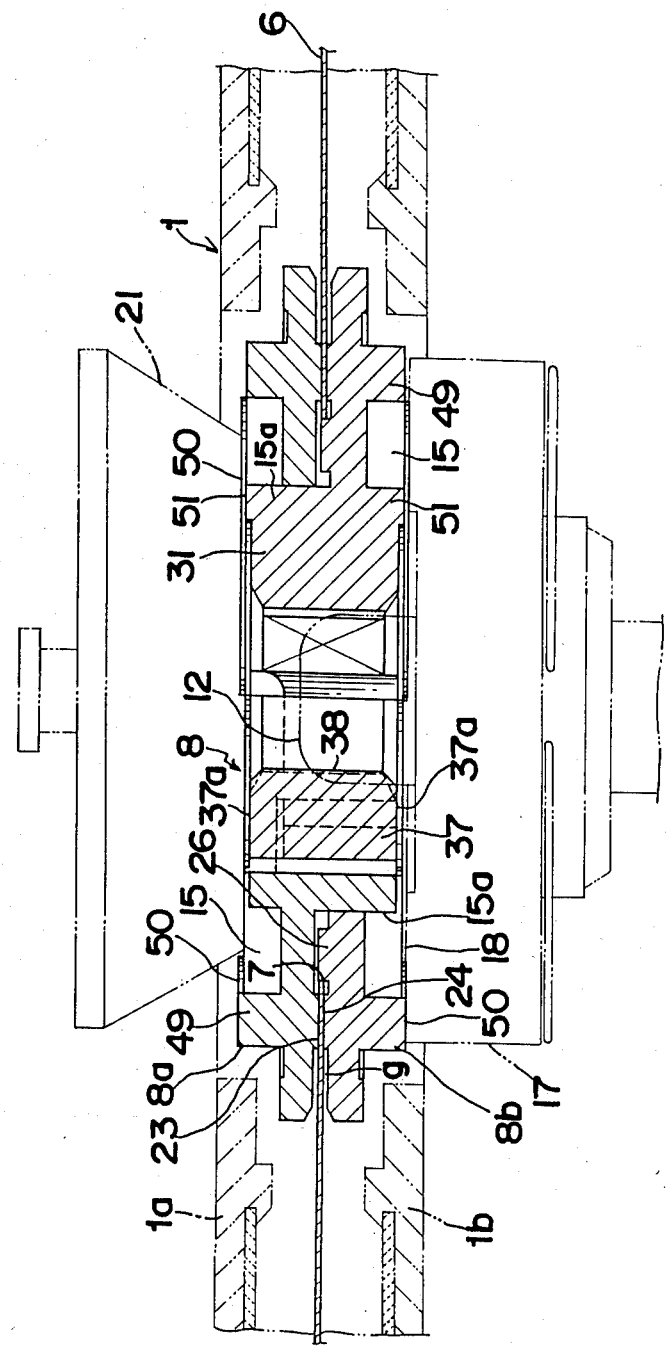
FIGS. 21 and 22 are partial cross sectional views showing the magnetic recording disc cartridge of the second embodiment of the present invention mounted on the drive unit.
Figure 22:
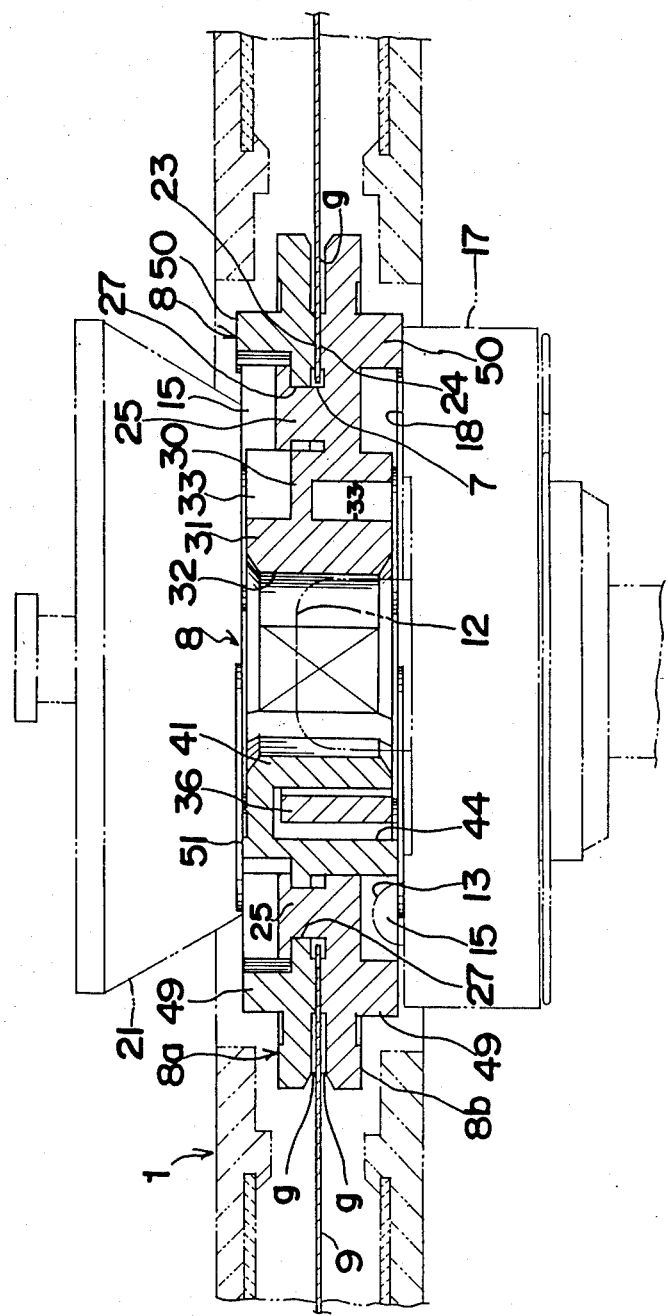
Figure 23:
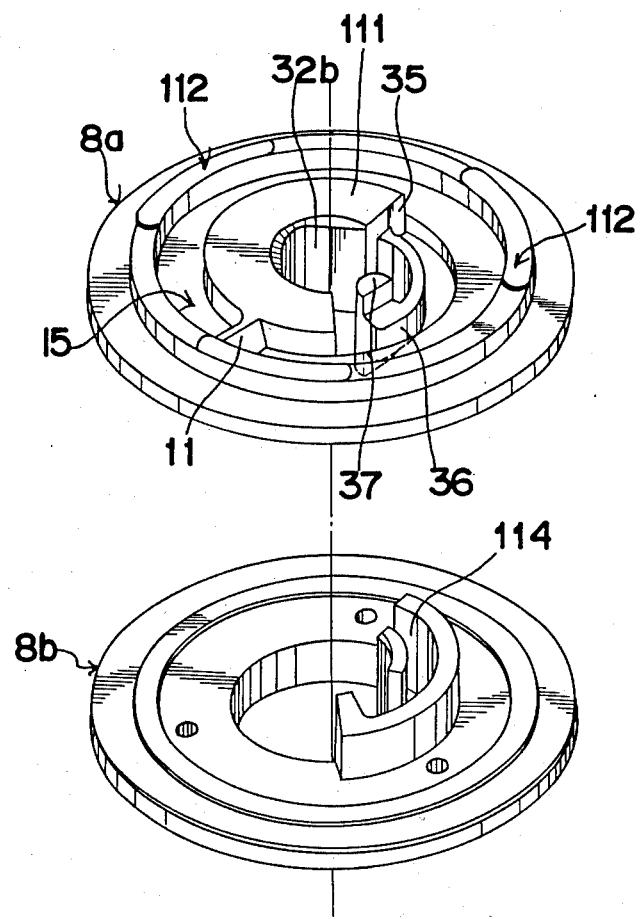
FIG. 23 is a perspective view showing a third embodiment of the present invention.
Figure 24:
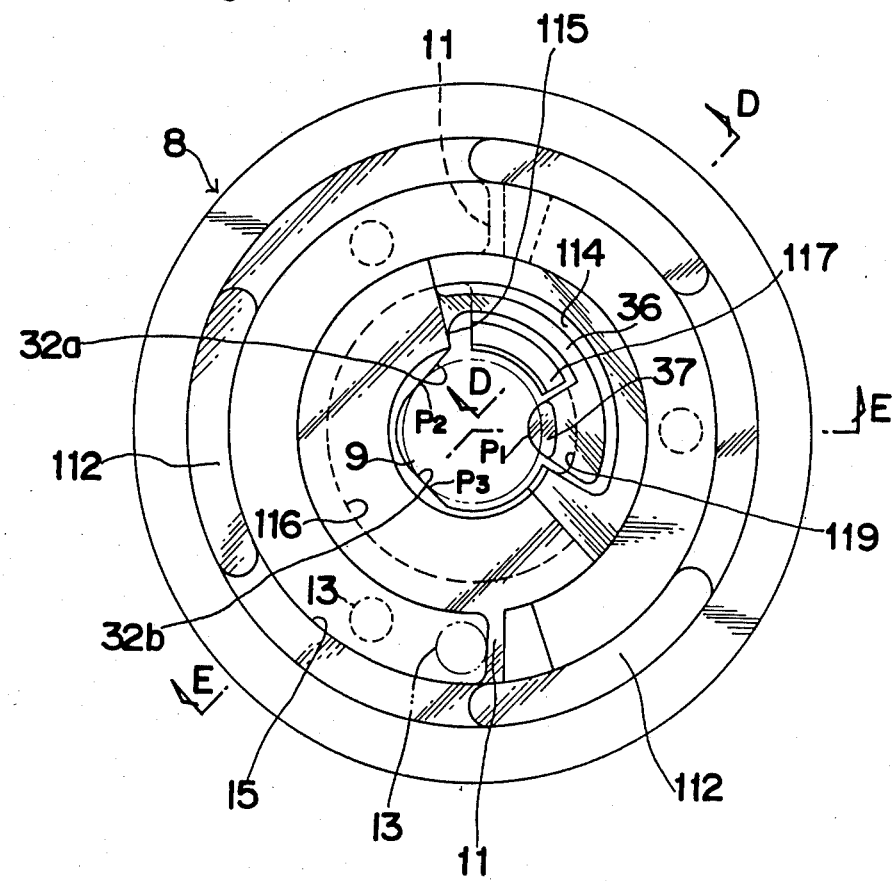
FIG. 24 is a top plan view of the hub assembly shown in FIG. 23.
Figure 25:
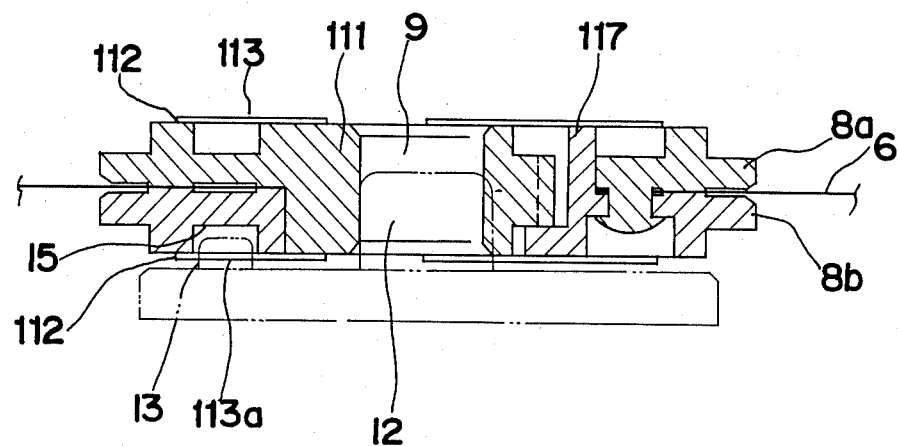
FIG. 25 is a cross sectional view taken along the line D—D in FIG. 24.
Figure 26:
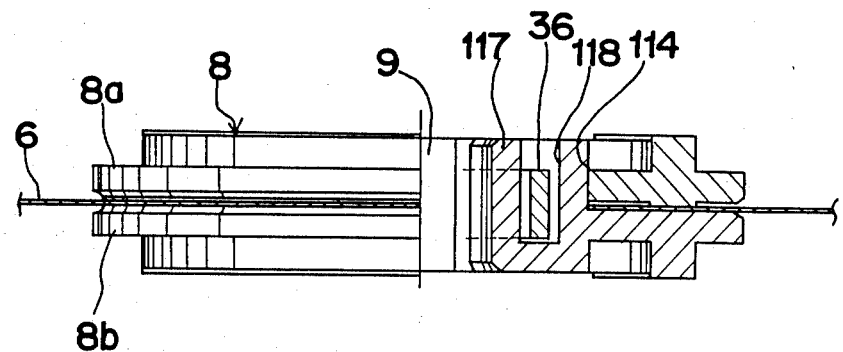
FIG. 26 is a partial cross sectional view taken along the line E—E in FIG. 24.
Figure 27:
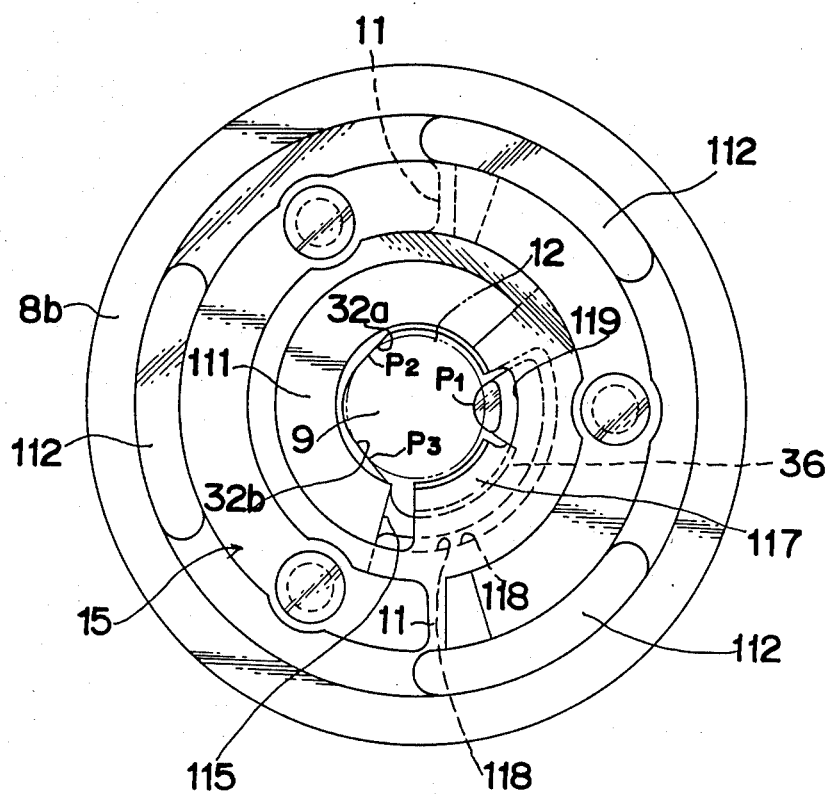
FIG. 27 is a bottom plan view of the hub assembly shown in FIG. 23.

As shown in FIGS. 9, 13 and 21, in positions close to the outer peripheries of the opposite surfaces of the hub members 8a and 8b, circular sheet clamping surfaces 23 and 24 are projectingly formed coaxially with the central axis P. In the upper surface of the lower hub member 8b, there are projectingly provided, innerwardly of the sheet clamping surface 24, four tall welding pins 25 and four small sheet locating pins 26 alternately arranged along inner and outer circumferential lines which are coaxial with the central axis P, while the upper hub member 8a has through-holes for engagement with the welding pins 25. Each of the sheet locating pins 26 is slightly higher than the sheet clamping surface 24, and the outer peripheral surface thereof is positioned radially outwardly of the welding pin 25. In assembling the magnetic recording disc 2, the magnetic recording sheet 6 is first placed on the lower hub member 8b, and the peripheral edge of the central hole 7 of the sheet 6 is brought outwardly in contact with the respective locating pins 26 so that the magnetic recording sheet 6 is properly located, as shown in FIG. 9, and the peripheral edge is preferably fixed by adhesion to the sheet clamping surfaces 24 to prevent rotation of the magnetic recording sheet 6 relative to the lower hub member 8b. Then the upper hub member 8a is placed on the lower hub member 8b while the welding pins 25 are guided to be engaged with the throughholes 27 so that the upper ends of the welding pins 25 are faced to the bottoms of the guide grooves 15 of the upper hub member 8a, and as shown in FIG. 22, the upper end portions of the welding pins 25 are welded by an ultrasonic welding method to connect the hub members 8a and 8b with each other by calking. In this condition, the periphery of the central hole of the magnetic recording sheet 6 is clamped only by the sheet clamping surfaces 23 and 24 of the hub members 8a and 8b, and a gap g is defined between the hub members 8a and 8b in the outer peripheral end portions outwardly of the sheet clamping surfaces 23 and 24. Thus, even if the magnetic recording sheet 6 is inferiorly clamped by the hub members 8a and 8b, other portions of the magnetic recording sheet 6 outward of the hub assembly 8 are not influenced by such inferior clamping. Further, since the locating pins 26 are positioned outwardly of the welding pins 25, welded pieces of the welding pins 25 produced between the hub members 8a and 8b will not reach the periphery of the central hole of the magnetic recording sheet 6, and thus the magnetic recording sheet 6 is effectively prevented from deformation.

Figure 20:
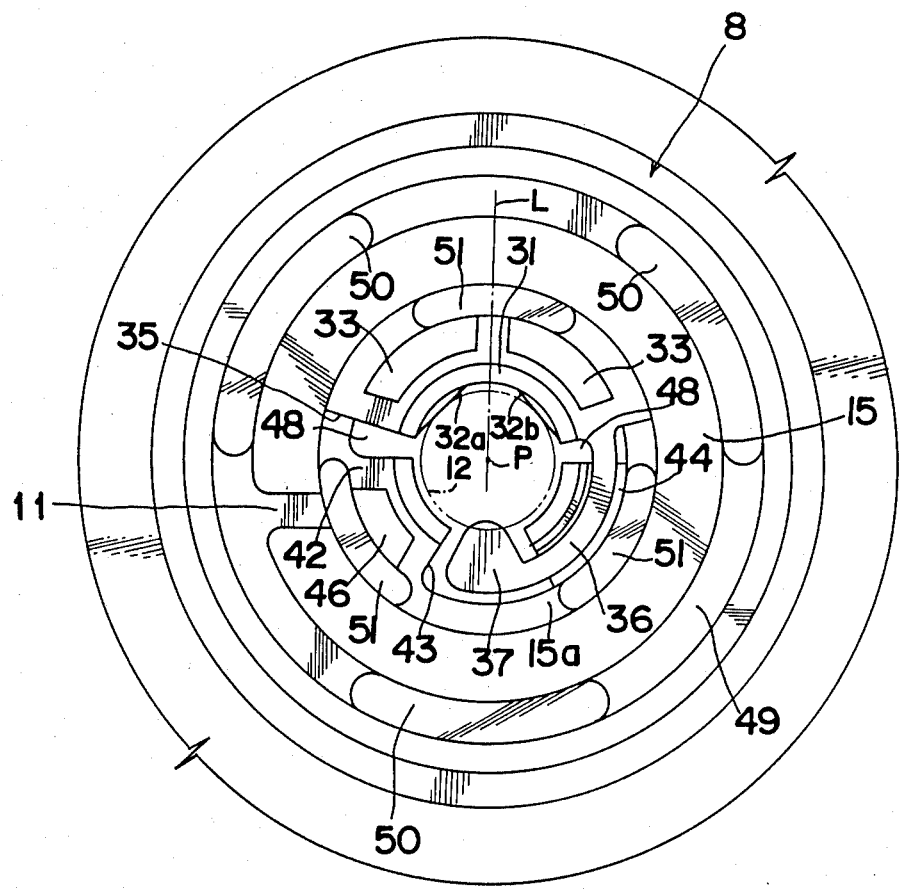
FIG. 20 is a bottom plan view of the hub assembly with the supporting shaft shown in chain line.

When the upper and lower hub members 8a and 8b are integrally connected with each other in the aforementioned manner, as shown in FIGS. 20 and 22, the intermediate portion of the arcuate arm 36 is engaged from below in the concave groove 44 of the upper hub member 8a with a space for allowing deformation of the arcuate arm 36 in the radial direction, while the contact member 37 is engaged in the concavity 43 between the first and second engaging walls 41 and 42 also with a space against the inner surface of the wall member 15a for allowing deformation of the arcuate arm 36 in the radial direction. In this condition, the arcuate surface 38 of the contact member 37 projects over the concave inner end surfaces 45 and 47 of the engaging walls 41 and 42 toward the central axis P, i.e., within the receiving hole 9.

Figure 19:
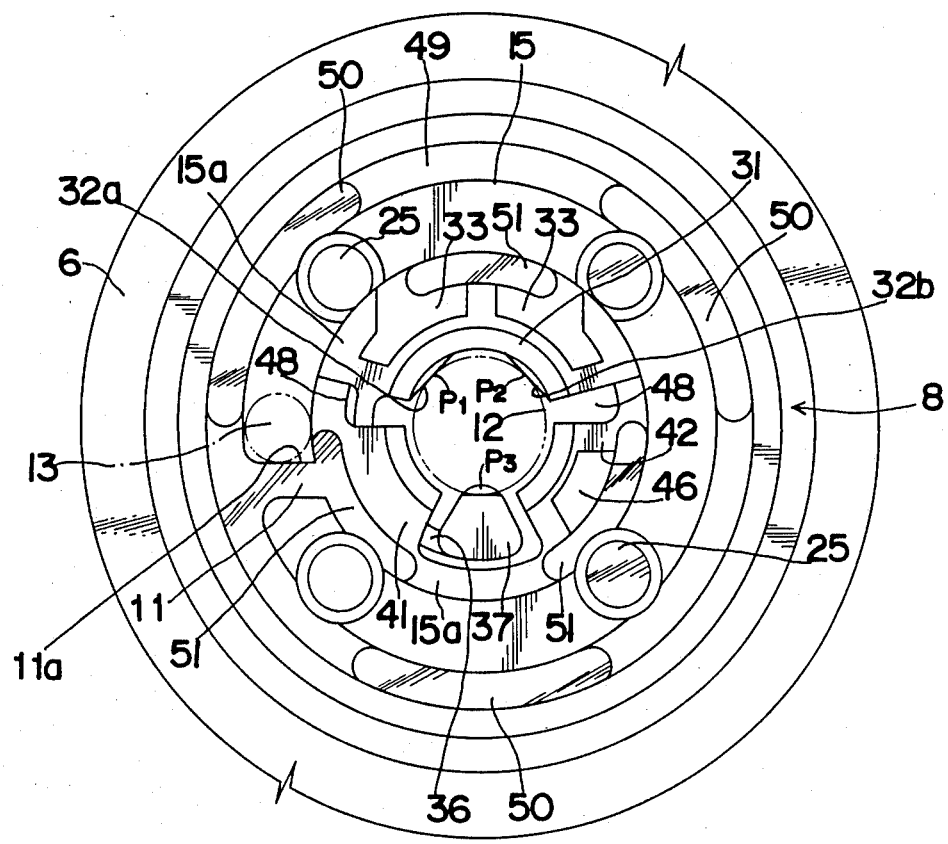
FIG. 19 is a top plan view of the hub assembly with a supporting shaft and a drive shaft of the drive unit shown in chain lines.

As shown in FIGS. 16 and 20, the magnetic recording/reproducing apparatus comprises a hub bearer 17 having a hub bearing surface 18 on which the supporting shaft 12 is provided high at the central portion and the drive shaft 13 is provided low at a portion at the periphery thereof and a conical collet 21 which is opposite to the hub bearer 17. When the magnetic recording disc cartridge is mounted in the recording/reproducing apparatus, the upper and lower end surfaces of the hub assembly 8 are clamped by the hub bearing surface 18 of the hub bearer 17 and the forward end surface of the collet 21 through the drive shaft insertion window 3, with the supporting shaft 12 inserted in the receiving hole 9 and the drive shaft 13 being engaged in the guide groove 15. Upon rotation of the hub bearer 17, the drive shaft 13, which is engaged in the guide groove 15, is brought into contact with the rib 11, as shown in FIG. 19.

In the aforementioned construction, when the magnetic recording disc cartridge according to the present invention is mounted in the magnetic recording/reproducing apparatus with the supporting shaft 12 being guided by the wall member 31 and the first and second engaging walls 41 and 42 to be inserted in the receiving hole 9 of the hub assembly 8, the arcuate surface 38 of the contact member 37 is brought elastically in contact with the outer periphery of the supporting shaft 12, while the contact surfaces 32a and 32b of the wall member 31 are urged by elastic force of the arm 36 supporting the contact member 37 to be in contact with the outer peripheral surface of the supporting shaft 12 to elastically hold the hub assembly 8 with respect to the supporting shaft 12 in contact at three portions, i.e., the contact point $P_3$ of the contact member 37 and the contact points $P_1$ and $P_2$ of the contact surfaces 32a and 32b. Since the supporting shaft 12 is held being pressed against the points $P_1$ and $P_2$, the magnetic recording disc 2 is effectively held in a desired position, thereby preventing deviation of the recording track. Since the arm 36 has a long cantilever span, the elastic contact force of the fixed outer contact points $P_1$ and $P_2$ with respect to the supporting shaft 12 is secured constant for a long period of time even if the cartridge is repeatedly used.

Figure 8:
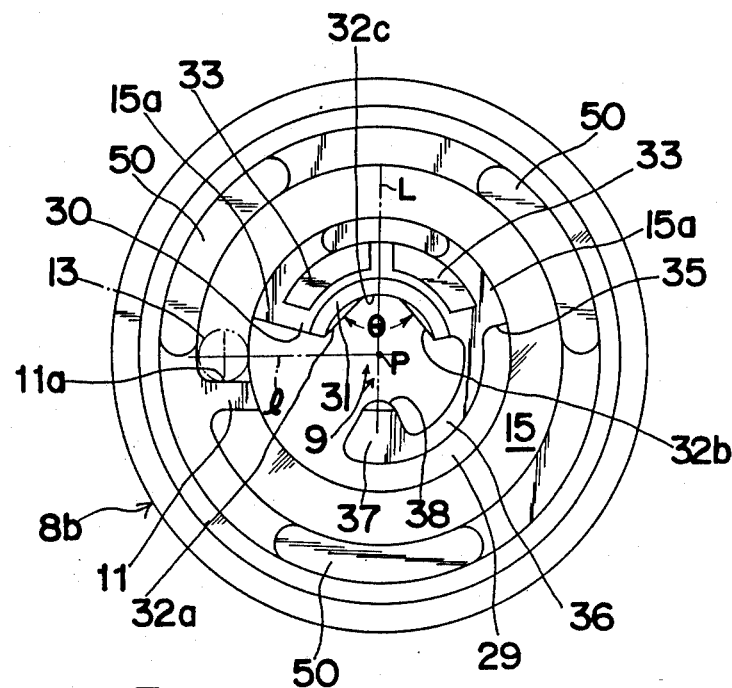
FIG. 8 is a top plan view of the lower hub member.
Figure 10:
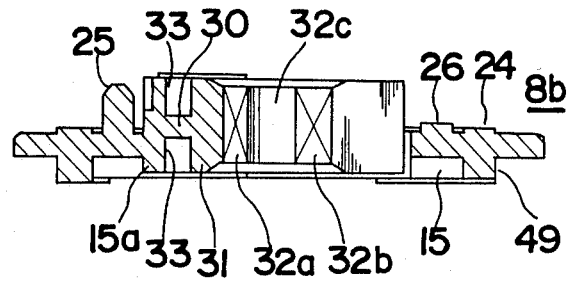
FIG. 10 is a cross sectional view taken along the line B—B in FIG. 7.
Figure 11:
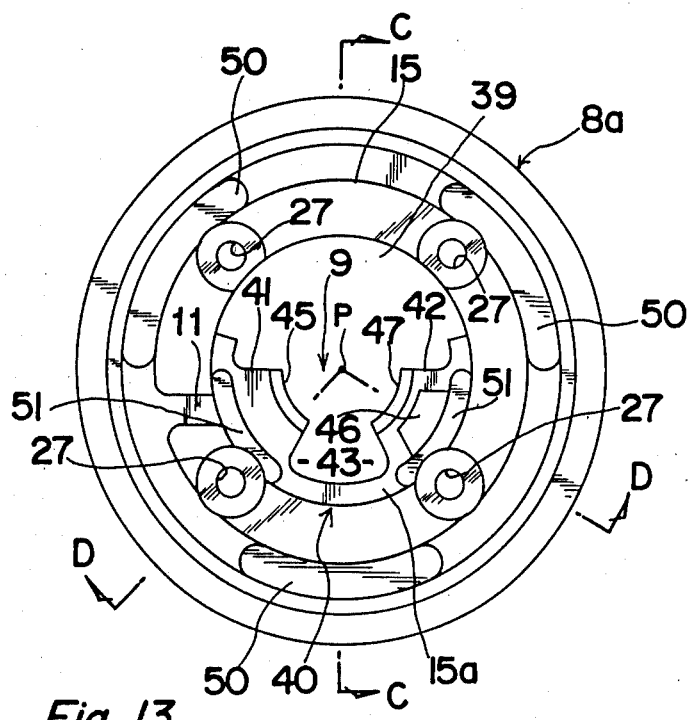
FIG. 11 is a bottom plan view of the upper hub member.

The contact surface 11a of the rib 11 intersecting the respective guide groove 15, which is in contact with the drive shaft 13, is formed nearly in parallel with a line l which passes the central axis P and is perpendicular to the symmetrical axis L of the contact surfaces 32a and 32b as shown in FIG. 8, and the size thereof is determined such that the central axis of the drive shaft 13 is located on the line l in a condition that the circular outer periphery of the drive shaft 13 is in contact with the contact surface 11a of the rib 11. Therefore, when the drive shaft 13 of the recording/reproducing apparatus is in contact with the rib 11 to rotatingly drive the magnetic recording disc 2, the contact surfaces 32a and 32b are further pressed by the outer periphery of the supporting shaft 12, thereby assuring mounting of the recording sheet 6 in the correct position to prevent deviation of the recording track.

In the condition that the upper and lower hub members 8a and 8b are integrally connected with each other, further, vertically pierced slots 48 (see FIG. 20) are defined between one end surface 35 of the wall member 31 and the first engaging wall 41 and between the other side surface 35 of the wall member 31 and the second engaging wall 42. That is, the two slots 48 are formed in the inner peripheral surface of the receiving hole 9 along the radial direction such that the contact surfaces 32a and 32b are symmetrical to the symmetrical axis L between the slots 48. Since, therefore, the contact surfaces 32a and 32b are separated from the other portions of the inner periphery of the receiving hole 9 by the slots 48 so that the thickness of the peripheral wall member 31 having the contact surfaces 32a and 32b can be adjusted also in the circumferential direction, accuracy in forming of the inner peripheral surface of the receiving hole 9, especially the outer contact surfaces 32a and 32b, is improved. In addition, the slots 48 further facilitate reduction of the weight of the hub assembly 8 itself and stabilization of the weight balance.

At each of the upper and lower end surfaces of the hub assembly 8, the projecting end surface of the annular projecting outer wall 49 of the guide groove 15 is provided with outer reference surfaces 50 for the hub bearer 17, which are projectingly formed in trisected positions, each having a predetermined width. In the end surface of the inner wall member 15a forming the inner wall of each guide groove 15, inner reference surfaces 51 for the collet 21 are projectingly formed in trisected positions to be lower than the outer reference surfaces 50. The hub bearing surface 18 of the hub bearer 17 is in contact with the upper or lower group of the outer reference surfaces 50 while the lower end surface of the collet 21 is in contact with the other group of the inner reference surfaces 51, as shown in FIG. 22.

The vertical length of the contact member 37 is so determined that upper and lower end surfaces 37a thereof are located inwardly of the inner reference surfaces 51 in the vertical direction a length corresponding to the projecting length of the reference surfaces 51 (see FIG. 9). Therefore, since the lower end surface of the collet 21 is not brought into contact with the upper end surface 37a of the contact member 37, to interfere therewith, the contact member 37 is reliably operated regardless of variations in dimensions of the hub assembly 8, thereby effectively securing accuracy in the alignment of the hub assemlby 8 with respect to the supporting shaft 12.

Each of the inner reference surfaces 51 balancedly clamps the upper and lower end surfaces of the hub assembly 8 between the adjacent pair of the outer reference surfaces 50 with the hub bearer 17 and the collet 21. Further, since a relation in arrangement is established such that one of the outer reference surfaces 50 is positioned outwardly of the peripheral wall member 31 so that all of the outer and inner reference surfaces are symmetrical to the symmetrical axis L of the contact surfaces 32a and 32b, sliding friction force of the outer reference surfaces 50 with respect to the hub receiving surface 18 upon movement of the contact member 37 for alignment of the hub assembly 8 with the supporting shaft 12 is uniform in the sliding direction, and thus the contact surfaces 32a and 32b are urged to be properly in contact with the outer periphery of the supporting shaft 12.

It is to be noted that the present invention is not limited to the shown embodiments as hereinabove described.

For example, the hub assembly 8 may be formed by two sections divided in the circumferential direction and integrally connected with each other or simultaneously integrally formed of plastic resin material. In such cases, the hub assembly 8 is provided in the vertical central portion of its outer periphery with a sheet sticking surface, to which the peripheral portion of the central hole 9 of the magnetic recording sheet 6 may be stick.

The contact member 37 is effective in securing alignment of the hub assembly 8 with respect to the supporting shaft 12 when the magnetic recording disc 2 is not operated in, e.g., an intermittent operation, to prevent deviation of the recording track in initiation of the operation, though, it is not necessarily provided in the magnetic recording disc cartridge.

The receiving hole 9 of the hub assembly 8 may be formed elliptical or polygonal in plan view with the contact surfaces 32a and 32b partially formed therein. Configuration of the receiving hole 9 and the contact surfaces 32a and 32b can be optionally modified provided that the contact surfaces 32a and 32b are in contact with the outer periphery of the supporting shaft 12 at the two points $P_1$ and $P_2$.

Further, the space 33 for adjusting the thickness of the wall member 31 of the receiving hole 9 having the contact surfaces 32a and 32b in the forming thereof may be provided in a pierced manner in the vertical direction, provided that the space 33 is at least in the outer portion of the contact surfaces 32a and 32b in the diametrical direction to prevent appearance of sink marks in the outer contact surfaces 32a and 32b after forming is completed.

In FIGS. 23 through 27 showing a third embodiment of the present invention, the upper hub member 8a is provided in its center with a semicircular partial boss 111 reaching the lower surface of the lower hub member 8a. Each of the hub members 8a and 8b is provided in the upper and lower end surfaces with annular guide grooves 15 coaxially along the outer periphery of the receiving hole 9. Each of the ribs 11 is symmetrically formed across each of the guide grooves 15 of the respective upper and lower hub members 8a and 8b. Semiarcuate bosses 112 are formed with trisected spaces defined therebetween in the upper surface of the upper hub member 8a and the lower surface of the lower hub member 8b, with the upper or lower surface of each of the bosses 12 being made plane to function as a reference surface. When the magnetic recording disc cartridge is mounted in the magnetic recording/reproducing apparatus, the supporting shaft 12 of the magnetic recording/reproducing apparatus and the drive shaft 13 arranged in an eccentric manner to the supporting shaft 12 are engaged in the receiving hole 9 and the guide groove 15 respectively, while the reference surface 112 is supported on the hub bearing surface 18. Upon rotation about the supporting shaft 12, the drive shaft 13 is moved within the guide groove 15 to be in contact with the rib 11, thereby rotatingly driving the magnetic recording disc 2.

The partial boss 111 of the upper hub member 8a is provided at its inner periphery with contact surfaces 32a and 32b similar to the previously explained embodiments, so that the outer peripheral surface of the supporting shaft 12 is brought into contact with the contact surfaces 32a and 32b at points $P_2$ and $P_3$ upon insertion of the supporting shaft 12 in the receiving hole 9.

The receiving hole 9 formed in the upper hub member 8a has in a position opposite to the partial boss 111 a fan-shaped hole 114 having a relatively wide central angle (about 150°) and an inner diameter larger than that of the partial boss 111. Like the second embodiment, an arcuately-curved arm 36, having its center of curvature at the center of the receiving hole 9, is formed projecting in a cantilever manner in a side wall surface 115 of the partial boss 111 defining one end of the fan-shaped hole 114. The arm 36 has a contact member 37 which is designed to be in contact with the outer periphery of the supporting shaft 12 inserted in the receiving hole 9 at an inner contact point $P_1$.

The lower hub member 8b has a hole 116 piercingly formed in the vertical direction for engagement with the partial boss 111 of the upper hub member 8a and a partial boss 117 which is engaged with the fan-shaped hole 114 of the upper hub member 8a. The partial boss 117 is provided in its inner periphery with a groove 118 which is semi-arcuate in plan view for receiving the arm 36 with spaces for free movement in the radial direction. The inner part of one end of the groove 118 is recessed at 119 in the radial direction, so that the contact member 37 of the arm 36 is disposed in the recess 119 with spaces for free movement in the radial direction.

The various modifications explained with respect to the second embodiment can also be applied to the third embodiment.

Although described with reference to preferred embodiments of the magnetic recording disc cartridges, the present invention can be applied to other types of recording disc cartridges such as optical recording disc cartridges.

The invention being thus described, it will be obvious that the same may be varied in many ways. Such variations are not to be regarded as a departure from the spirit and scope of the present invention, and all such modifications as would be obvious ton one skilled in the art are intended to be included within the scope of the following claims.

What is claimed is:

1. A magnetic recording disc cartridge comprising:
   a magnetic recording disc having a central hole,
   a cartridge case in which said magnetic recording disc is rotatably mounted having a first opening or insertion of a drive unit and a second opening for insertion of a recording head, and
   a hub assembly to which said disc is attached about the periphery of said central hole of said disc, said hub assembly comprising a upper hub member and a lower hub member integrally connected with each other having a receiving hole defined in a central portion thereof having an inner periphery surface for receiving a supporting shaft of said drive unit, at least one annular guide groove concavely formed in upper and lower end surfaces of said upper and lower hub members coaxially with said receiving hole for receiving a drive shaft of said drive unit, which drive shaft is eccentrically located with respect to said supporting of said drive unit, said at least one guide groove being provided with a rib structure formed therein such that when said supporting shaft is rotated, said drive shaft is moved in said at least one guide groove to be engaged with said rib structure thereby rotating said hub assembly and said magnetic disc, said lower hub member being provided with a through hole formed in a central portion thereof having a wall member which projects inwardly from an inner cylindrical surface of said lower hub member which defines said through hole, said wall member having an inner periphery surface defining a part of said inner periphery of said receiving hole which is provided with a pair of flat contact surfaces formed at a predetermined angle to be in line contact with an outer peripheral surface of said supporting shaft, said contact surfaces being symmetrical to a central axis of said hub assembly, and an arcuate resilient member having a contact portion projecting from one side surface of said wall member to a position opposite said inner peripheral surface of said wall member between said flat surfaces having radial resiliency, such that when said supporting shaft of said drive unit is inserted in said receiving hole, said supporting shaft is securely held between said resilient member and said contact surfaces.

2. The magnetic recording disc cartridge of claim 1, wherein annular guide grooves of said hub assembly are formed in said upper and lower end surfaces of each of said upper hub member and lower hub member with respective rib structures formed therein.

3. The magnetic recording disc cartridge of claim 1, wherein said rib structure of said hub assembly comprises an end surface flush with an end surface of said hub assembly, a first side surface of said rib formed vertically extending radially across said respective guide groove, perpendicular to said end surface and a second side surface inclined downwardly, such that when said magnetic disc and supporting shaft are rotated, said drive shaft is moved in the respective guide groove to be engaged with said respective vertical surface of said corresponding rib and if said drive shaft were to be brought into contact with said end surface of said rib upon mounting of said magnetic recording disc cartridge, said drive shaft would slide downwardly along said inclined surface so as to be guided into said respective guide groove.

4. The magnetic recording disc cartridge of claim 2, wherein said guide grooves are symmetrically formed in said upper and lower end surfaces of said upper and lower hub members of said hub assembly.

5. The magnetic recording disc cartridge of claim 1, wherein said wall member of said lower hub member of said hub assembly is a fan-shaped member projecting from said inner cylindrical surface inwardly at an angle of about 150° in the circumferential direction.

6. The magnetic recording disc cartridge of claim 1, wherein in said hub assembly said predetermined angle between said contact surfaces ranges from abut 60° to 120°.

7. The magnetic recording disc cartridge of claim 6, wherein said predetermined angle is about 90°.

8. The magnetic recording disc cartridge of claim 1, wherein said upper hub member of said hub assembly comprises a through hole formed in a central portion thereof which engages with said inner periphery surface of said wall member of said lower hub member and said upper hub member further includes a boss for engagement with a corresponding through hole of said lower hub member.

9. The magnetic recording disc cartridge of claim 1, wherein said recording disc comprises a flexible magnetic sheet.

10. The magnetic recording disc cartridge of claim 3, wherein in said rib assembly the contact surface of said rib structure intersecting the respective guide groove in contact with said drive shaft is formed substantially parallel with a line which passes through a central axis of said hub assembly and is perpendicular to a symmetrical axis of the contact surfaces of said wall member.

11. The magnetic recording disc cartridge of claim 1, wherein said contact portion of said resilient member of said hub assembly has a vertical length such that the upper and lower end surfaces thereof are located slightly inward of respective upper and lower reference surfaces of said hub assembly.

12. A hub assembly for a magnetic recording disc cartridge including a magnetic recording disc and a cartridge case, said hub assembly comprising:
a hub assembly to which said disc is attached about the periphery of said central hole of said disc, said hub assembly comprising a upper hub member and a lower hub member integrally connected with each other having a receiving hole defined in a central portion thereof having an inner periphery surface for receiving a supporting shaft of said drive unit, at least one annular guide groove concavely formed in an upper and lower end surfaces of said upper and lower hub members coaxially with said receiving hole for receiving a drive shaft of said drive unit, which drive shaft is eccentrically located with respect to said supporting of said drive unit, said at least one guide groove being provided with a rib structure formed therein such that when said supporting shaft is rotated, said drive shaft is moved in said at least one guide groove to be engaged with said rib structure thereby rotating said hub assembly and said magnetic disc, said lower hub member being provided with a through hole formed in a central portion thereof having a wall member which projects inwardly from an inner cylindrical surface of said lower hub member which defines said through hole, said wall member having an inner periphery surface defining a part of said inner periphery of said receiving hole which is provided with a pair of flat contact surfaces formed at a predetermined angle to be in line contact with an outer peripheral surface of said supporting shaft, said contact surfaces being symmetrical to a central axis of said hub assembly, and an arcuate resilient member having a contact portion projecting from one side surface of said wall member to a position opposite said inner peripheral surface of said wall member between said flat surfaces having radial resiliency, such that when said supporting shaft of said drive unit is inserted in said receiving hole, said supporting shaft is securely held between said resilient member and said contact surfaces.

13. The hub assembly of claim 12, wherein annular guide grooves of said hub assembly are formed in said upper and lower end surfaces of each of said upper hub member and lower hub member with respective rib structures formed therein.

14. The hub assembly of claim 12, wherein said rib structure of said hub assembly comprises an end surface flush with an end surface of said hub assembly, a first side surface of said rib formed vertically extending radially across said respective guide groove, perpendicular to said end surface and a second side surface inclined downwardly, such that when said magnetic disc and supporting shaft are rotated, said drive shaft is moved in the respective guide groove to be engaged with said respective vertical surface of said corresponding rib and if said drive shaft were to be brought into contact with said end surface of said rib upon mounting of said magnetic recording disc cartridge, said drive shaft would slide downwardly along said inclines surface so as to be guided into said respective guide groove.

15. The hub assembly of claim 13, wherein said guide grooves are symmetrically formed in said upper and lower end surfaces of said upper and lower hub members of said hub assembly.

16. The hub assembly of claim 12, wherein said wall member of said lower hub member of said hub assembly is a fan-shaped member projecting from said inner cylindrical surface inwardly at an angle of about 150° in the circumferential direction.

17. The hub assembly of claim 12, wherein in said hub assembly said predetermined angle between said contact surfaces ranges from abut 60° to 120°.

18. The hub assembly of claim 17, wherein said predetermined angle is bout 90°.

19. The hub assembly of claim 12, wherein said upper hub member of said hub assembly comprises a through hole formed in a central portion thereof which engages with said inner periphery surface of said wall member of said lower hub member and said upper hub member further includes a boss for engagement with a corresponding through hole of said lower hub member.

20. The hub assembly of claim 12, wherein said recording disc comprises a flexible magnetic sheet.

21. The hub assembly of claim 14, wherein in said rib assembly the contact surface of said rib structure intersecting the respective guide groove in contact with said drive shaft is formed substantially parallel with a line which passes through a central axis of said hub assembly and is perpendicular to a symmetrical axis of the contact surfaces of said wall member.

22. The hub assembly of claim 12, wherein said contact portion of said resilient member of said hub assembly has a vertical length such that upper and lower end surfaces thereof are located slightly inward of respective upper and lower reference surfaces of said hub assembly.

* * * * *